(12) United States Patent
Katou et al.

(10) Patent No.: US 6,340,929 B1
(45) Date of Patent: Jan. 22, 2002

(54) TRANSMITTER AND EXTERNAL CONTROLLER OF TIRE INFLATION PRESSURE MONITOR

(75) Inventors: Michiya Katou, Ichinomiya; Kazunori Sawafuji, Ogaki; Akira Momose, Hashima, all of (JP)

(73) Assignee: Pacific Industrial Co., LTD, Gifu-ken (JP)

( * ) Notice: Subject to any disclaimer, the term of this patent is extended or adjusted under 35 U.S.C. 154(b) by 0 days.

(21) Appl. No.: 09/439,681

(22) Filed: Nov. 15, 1999

(30) Foreign Application Priority Data

Nov. 19, 1998 (JP) ............................................ 10-329104
Dec. 17, 1998 (JP) ............................................ 10-358316

(51) Int. Cl.⁷ .................................................. B60C 23/00
(52) U.S. Cl. ........................ 340/447; 340/445; 73/146.5
(58) Field of Search ................................ 340/442, 445, 340/447, 448, 449; 73/146.5, 146.8

(56) References Cited

U.S. PATENT DOCUMENTS 6,034,596 A * 3/2000 Smith et al. ................. 340/447

FOREIGN PATENT DOCUMENTS

JP WO94/20317 9/1994
JP 11-180117 7/1999

* cited by examiner

Primary Examiner—Daryl Pope
(74) Attorney, Agent, or Firm—Pate Pierce & Baird

(57) ABSTRACT

A transmitter of a tire inflation monitor performs wireless transmission of data concerning tire inflation pressure from an antenna coil to a receiver. The transmitter includes a signal generation circuit, which is connected to the antenna coil. The signal generation circuit generates a trigger signal for activating or inactivating a controller of the transmitter based on a particular control signal received from a predetermined external controller through the antenna coil. When the controller is activated by the trigger signal, the transmitter starts wireless transmission of the data. When the controller is deactivated by the trigger signal, the transmitter is in a sleep state. In this way, data transmission from the transmitter is easily and externally started or stopped.

9 Claims, 4 Drawing Sheets

TRANSMITTER AND EXTERNAL CONTROLLER OF TIRE INFLATION PRESSURE MONITOR

BACKGROUND OF THE INVENTION

The present invention relates to a tire inflation pressure monitor. More specifically, the present invention pertains to a transmitter that transmits data, especially data relating to tire inflation pressure, to a receiver attached to an associated vehicle body. The present invention also relates to an external controller that externally controls the operation of the transmitter.

Wireless tire inflation pressure monitors that permit the tire inflation pressure of vehicle tires to be checked from the passenger compartment are known. The known tire inflation pressure monitor includes transmitters that are respectively attached to the wheels and a receiver located in the body of the vehicle. Each transmitter measures the tire inflation pressure of a corresponding tire and transmits data, which includes the measured pressure, by radio waves. The receiver receives the transmitted data and a display in front of the driver displays the information.

Each transmitter transmits data relating to the tire inflation pressure of a corresponding tire to one receiver. The receiver has to distinguish which transmitter the data is from. Therefore, each transmitter has its own ID code and transmits tire inflation pressure data and ID data, which include the ID code. Therefore, the receiver recognizes the transmitter that transmitted the tire inflation pressure data, based on the ID data.

The ID codes of the transmitters in the tires must be registered in the receiver in advance so that the receiver can associate a given set of tire inflation pressure with a transmitter. Therefore, when a new tire is attached to the vehicle or when the position of a tire relative to the vehicle is changed, the ID codes of the transmitters in the tires are initially registered in the receiver. In detail, the receiver includes an initialization switch that is operated when the ID codes are initially registered. When the switch is operated, the ID codes that are included in the data transmitted by the transmitters are initially registered in the receiver.

Since each transmitter is powered by a built-in battery, each transmitter stops operation when the battery is dead. However, the transmitters are attached to the wheels inside the tires. When the batteries are replaced, the tires must be removed from the wheels, which is troublesome. Therefore, generally, data transmission from each transmitter is carried out intermittently at predetermined intervals (for example, ten-minute intervals). As a result, the transmitters can operate for a relatively long period without replacing the batteries.

The initial registration of the ID codes of the transmitters is not complete until all the transmitters in the tires finish data transmission after the initialization switch of the receiver is operated. However, as already mentioned, each transmitter performs data transmission at, for example, ten-minute intervals, which are relatively long intervals. Therefore, it takes ten minutes at the longest to complete the initial registration after the initialization switch is operated. If the interval time of data transmission of each transmitter is shortened to reduce the time spent for the initial registration, the life of the battery of each transmitter is shortened.

Wireless communication is performed between each transmitter and the receiver. The output of radio waves is regulated in each nation by different laws. When the transmitters manufactured in one country are shipped to another country, the radio wave output by the transmitters may not comply with the communication laws of the country that manufactures the transmitters, although it complies with the laws of the destination country. In that case, operation of the manufactured transmitters must be stopped in the manufacturer's country. Also, in the country to which the transmitters are shipped, the transmitters must be started. However, the transmitters are designed on the assumption that the batteries will not require replacement. To stop and restart the operation of the manufactured transmitters, the batteries have to be detached and reattached, which is difficult and troublesome.

A typical transmitter integrally includes a valve stem. When the transmitter is attached to a wheel, the valve stem projects outward from the wheel. An antenna coil is located close to the valve stem. The antenna coil is coated with insulating material. The transmitter wirelessly transmits data through the valve stem and the antenna coil by wireless.

To improve the efficiency of emitting radio waves from the antenna coil, it is preferred to attach the antenna coil to a part as close as possible to the distal end of the valve stem. However, since the valve stem functions as an inlet for air into the tire, an optimally placed antenna may be an obstacle to filling the tire with air.

Therefore, the antenna coil is actually attached near the proximal end of the valve stem. However, various wheel designs exist in the market, and some wheels do not permit the valve stem to project from the wheels. When the transmitters are attached to such wheels, the antenna coil cannot emit radio wave efficiently. Therefore, the shapes of wheels to which the transmitters can be attached are limited.

SUMMARY OF THE INVENTION

An objective of the present invention is to provide a transmitter for tire inflation pressure monitors that can readily stop or start data transmission without the need for troublesome procedures.

Another objective of the present invention is to provide a transmitter for tire inflation pressure monitors that can improve the efficiency of transmitting radio waves.

A further objective of the present invention is to provide an external controller that is suitable for controlling the operation of a transmitter.

To achieve the above objectives, the present invention provides a transmitter for performing wireless transmission of data concerning vehicle tire inflation pressure. The transmitter includes a transmission antenna, a pressure sensor for measuring the tire inflation pressure, a transmission circuit for sending data that includes data representing the measured tire inflation pressure to the antenna for wireless transmission, a controller for controlling the pressure sensor and the transmission circuit, and a signal generation circuit. The signal generation circuit is connected to the antenna, generates a trigger signal for activating or deactivating data transmission from the transmission circuit based on a particular signal received through the antenna, and sends the trigger signal to the controller.

The present invention further provides a transmitter for performing wireless transmission of data concerning tire inflation pressure of a tire supported by a vehicle wheel. The transmitter is structured as follows. A main body is located inside the tire. A valve stem extends from the main body through the wheel. A removable cap is attached to the distal end of the valve stem. An antenna coil is embedded in the cap. A pressure sensor is located in the main body to measure the tire inflation pressure. A transmission circuit is located in the main body. The transmission circuit sends data that includes data representing the measured tire inflation pressure to the antenna coil through the valve stem for wireless transmission.

The present invention further provides an external controller for controlling a wheel transmitter that performs wireless transmission of data concerning tire inflation pressure of a vehicle tire. The external controller includes a wireless transmission antenna, an operation switch, an oscillator, which generates a trigger signal for activating or deactivating the transmission of data from the wheel transmitter when the operation switch is turned on, and a transmission circuit, which demodulates and sends the generated trigger signal to the transmission antenna.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of he presently preferred embodiments together with the accompanying drawings in which.

DETAILED DESCRIPTION OF THE PREFERRED EMBODIMENTS

Figure 1:
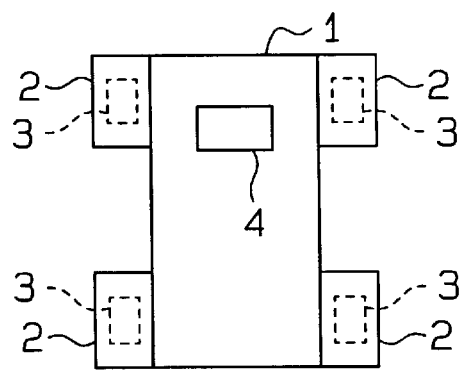
FIG. 1 is a diagrammatic view showing a tire inflation pressure monitor according to one embodiment of the present invention.

A tire inflation pressure monitor according to one embodiment of the present invention will now be described with reference to FIGS. 1–7. As shown in FIG. 1, the monitor includes four transmitters 3, which are attached, respectively, to the tires 2 of a vehicle 1, and a receiver 4, which is attached to the body of the vehicle 1. Each transmitter 3 measures the tire inflation pressure of the corresponding tire 2 and transmits data including the measured pressure data to the receiver 4 by wireless. All the transmitters are identical, therefore, only one transmitter will be described for simplifying the description.

Figure 2:
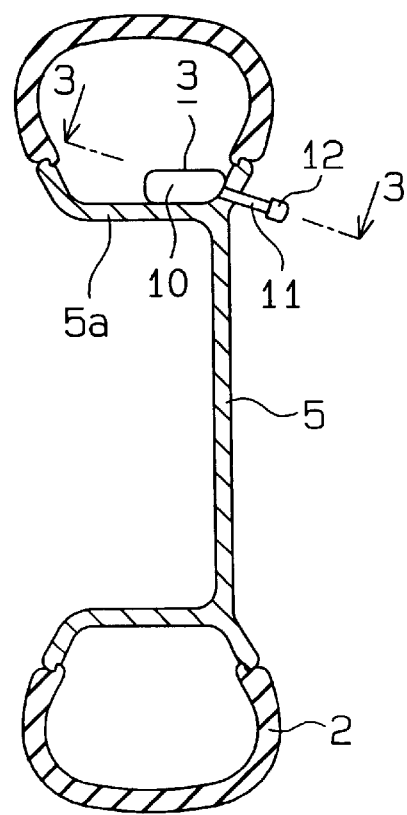
FIG. 2 is a cross-sectional view of a tire to which a transmitter of the monitor of FIG. 1 is attached.

As shown in FIG. 2, the transmitter 3 includes a case 10, or a main body. The case 10 is fixed to a rim 5a of a wheel 5 inside the corresponding tire 2. The transmitter 3 also includes a valve stem 11, which projects outward from the case 10 through the rim 5a. The valve stem 11 is made of a conductive material, which is preferably metal. Air is injected into the tire 2 through the valve stem 11. A detachable cap 12 is fitted on the distal end of the valve stem 11.

The structure of the transmitter 3 will now be described with reference to FIG. 3. A signal processor 13, a pressure sensor 14, and a battery 15 are located in the case 10 of the transmitter 3. The battery 15 powers the transmitter 3. The pressure sensor 14 measures the tire inflation pressure of the tire 2 and outputs the measured pressure data to the signal processor 13. The signal processor 13 processes data including the measured pressure data to carry out wireless transmission. The details of the signal processor 13 will be described later.

The valve stem 11 is fixed to the case 10 and the proximal end of the valve stem 11 is located in the case 10. A snap ring 16 is fitted on the proximal end of the valve stem 11 in the case 10. A lead wire 17 electrically connects each signal processor 13 to the snap ring 16. Accordingly, each signal processor 13 is electrically connected to the valve stem 11 via the lead wire 17 and the snap ring 16. The lead wire 17 is soldered to the snap ring 16.

The rim 5a has a through hole 6 for receiving the valve stem 11. A rubber grommet 18 is fitted in the through hole 6. The valve stem 11 passes through the grommet 18 from the interior of the rim 5a and projects outward from the rim 5a. Another rubber grommet 19 and a washer 20 are located on the exterior of the rim 5a to receive the projecting valve stem 11. Also, male threads 11a are formed on a distal part of the valve stem 11. A nut 21 is screwed onto the male threads 11a. The valve stem 11 is fixed to the rim 5a by the nut 21.

The cap 12 is threaded to the male threads 11a and is thus attached to the distal end of the valve stem 11. The cap 12 includes a cylinder 22 having a closed end, an insulator 23 covering the cylinder 22, and an antenna coil 24 embedded in the insulator 23 to surround the cylinder 22.

The cylinder 22 is made of a conductive material, which is preferably metal. Female threads 22a are formed on the inner surface of the cylinder 22 and engage the male threads 11a of the valve stem 11. The insulator 23 is made of rubber or resin. The antenna coil 24 is electrically connected to the cylinder 22. Accordingly, when the cylinder 22 is threaded onto the male threads 11a, the antenna coil 24 is electrically connected to the valve stem 11 through the cylinder 22. A shock absorber 25 is located on the inner end surface of the cylinder 22. The shock absorber 25 is made of, for example, rubber.

The electrical structure of the transmitter will now be described with reference to FIG. 4. The signal processor 13 of the transmitter 3 includes a controller 30, which is a kind of microcomputer. The controller 30 includes, for example, a central processing unit (CPU), a random access memory (RAM), and a read only memory (ROM). A unique ID code is registered in an internal memory, for example, in a ROM, in advance. The ID code is used to distinguish each of the transmitters 3 from one another.

The controller 30 outputs data including the pressure data from the pressure sensor 14 and the ID code registered in the internal memory to the transmission circuit 31. The transmission circuit 31 signalizes and modulates the data from the controller 30 and then sends the data to an impedance matching circuit 32.

Figure 3:
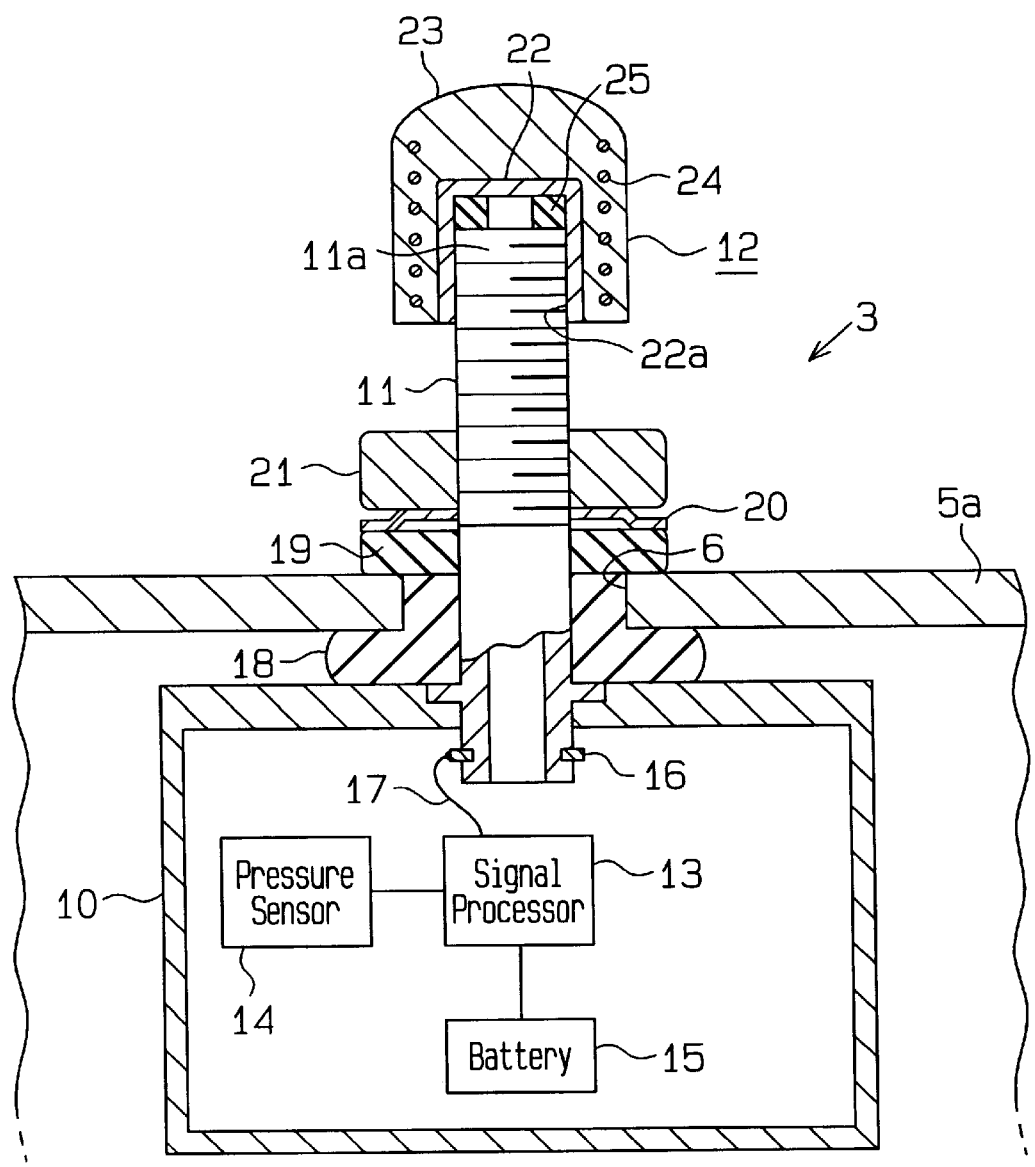
FIG. 3 is an enlarged cross-sectional view taken on line 3—3 of FIG. 2.
Figure 4:
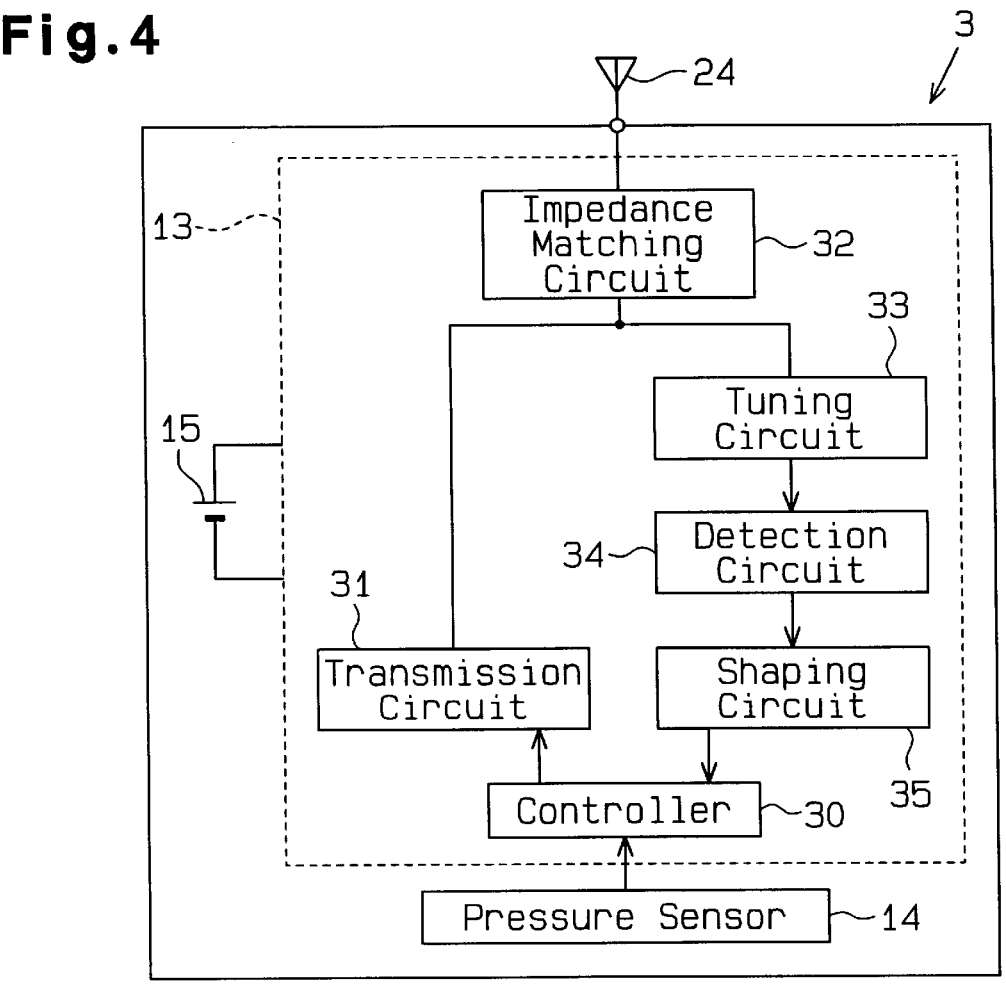
FIG. 4 is a block circuit view of the transmitter of FIG. 3.

Although not shown in FIG. 4, the impedance matching circuit 32 is electrically connected to the valve stem 11 through the lead wire 17 shown in FIG. 3. Accordingly, the transmission circuit 31 sends data including the pressure data and the ID code to the antenna coil 24 through the impedance matching circuit 32, the lead wire 17 and the valve stem 11. The antenna coil 24 wirelessly transmits the data from the transmission circuit 31. The impedance matching circuit 32 matches the impedance of the signal processor 13 to that of the antenna coil 24.

The controller 30 causes the pressure sensor 14 to measure the pressure at predetermined time intervals. Every time the number of measurements by the pressure sensor 14 reaches a predetermined value, the controller 30 causes the transmission circuit 31 to perform a transmission. Suppose that the measurement interval is fifteen seconds and the predetermined value, or the number of measurements by the pressure sensor 14 between regular transmissions, is forty. In this case, the controller 30 causes the transmission circuit 31 to transmit data every ten minutes. However, when recognizing a sudden change in the internal air pressure of the tire 2 based on the data from the pressure sensor 14, the controller 30 instructs the transmission circuit 31 to transmit data regardless of the regular transmission interval.

A tuning circuit 33, a detection circuit 34, and a shaping circuit 35 function as a signal generation circuit for generating a signal that activates or deactivates the transmitter 3 based on a particular control signal from an external controller 7 of FIG. 6, which will be described later. The term "deactivate" does not necessarily mean that the controller 30 is turned off. It simply means that the controller 30 no longer instructs the transmission circuit 31 to transmit data.

Figure 7:
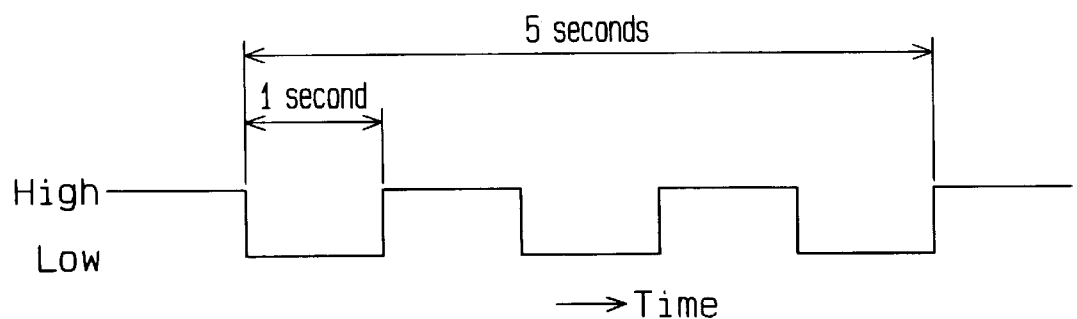
FIG. 7 is a timing chart showing trigger signals generated by the external controller of FIG. 6.

FIG. 7 illustrates the control signal (trigger signal) from the external controller 7. The control signal is, for example, a cyclical frequency that fluctuates from a high level to a low level or from the low level to a high level in a certain period of time (one second in the present embodiment). The period of time does not have to be one second and may be changed, and the high-level period may be different from a low-level period in the control signal.

The tuning circuit 33 is connected to the impedance matching circuit 32. When a signal is input from the antenna coil 24 to the tuning circuit 33 through the impedance matching circuit 32, the tuning circuit 33 selects only a signal of a certain frequency, or the control signal from the external controller 7, and outputs the selected control signal to the detection circuit 34. Accordingly, the tuning circuit 33 excludes noise or any signal other than the control signal from the external controller 7.

The detection circuit 34 demodulates the input control signal and sends it to the shaping circuit 35. The shaping circuit 35, which is an electric element including a transistor, shapes the waveform of the input control signal to a predetermined signal, that is, to the control signal shown in FIG. 7. The shaping circuit 35 outputs the shaped control signal, or the control signal shown in FIG. 7, to the controller 30 as a trigger signal.

When a predetermined number (three in the present embodiment) of low-level signals of the trigger signal are input to the controller 30 in a predetermined period (five seconds in the present embodiment), the controller 30 is activated. The activated controller 30 immediately commands the transmission circuit 31 to send data that includes the pressure data from the pressure sensor 14 and the registered ID data, which causes the transmitter 3 to start its normal operation.

During the normal operation of the transmitter 3, if three low-level signals of the trigger signal are input to the controller 30 in a period of five seconds, the controller 30 is deactivated, which stops the operation of the transmitter 3.

Figure 5:
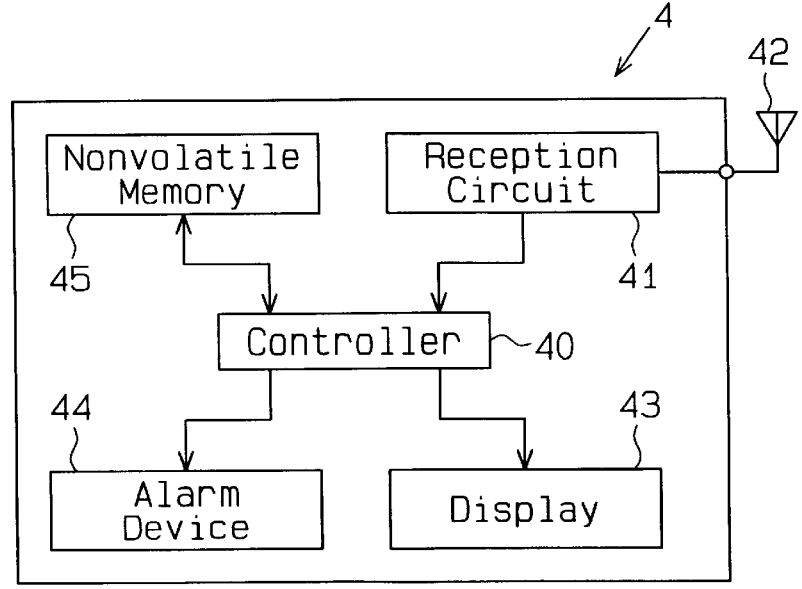
FIG. 5 is a block circuit view of a receiver of the monitor of FIG. 1.

The electrical structure of the receiver 4 will now be described with reference to FIG. 5. The receiver 4 includes a controller 40, which is a kind of microcomputer. The controller 40 includes, for example, a CPU, a RAM, and a ROM. A reception circuit 41 receives the data transmitted from each transmitter 3 through a receiver antenna 42 and demodulates and decodes the data and sends the data to the controller 40. The controller 40 judges the internal air pressure of the corresponding tire 2, based on the ID data and the pressure data included in the received data.

The controller 40 also commands a display 43 to display information concerning tire inflation pressure and other necessary information. The display 43 is located in a visible range of a driver in the vehicle 1. The controller 40 further instructs an alarm device 44 to give notice of an abnormality in the inflation pressure. The alarm device includes, for example, a device that warns of abnormality by sound or by light. The display 43 may display the warning.

The receiver 4 is, for example, powered by a battery (not shown) of the vehicle 1 and is started when the key switch (not shown) of the vehicle 1 is turned on. Also, the receiver 4 includes a nonvolatile memory 45 so that data is stored when the supply of electric power is cut. The ID codes of the transmitters 3 in the four tires 2 of the vehicle 1 are initially registered in the nonvolatile memory 45.

The receiver 4 includes an initialization switch (not shown) that is operated to initially register the ID codes. The ID codes included in the data from the transmitters 3 are initially registered in the nonvolatile memory 45 by operating the initialization switch. The initial registration is carried out when the tires 2 are initially attached to the vehicle 1.

Figure 6:
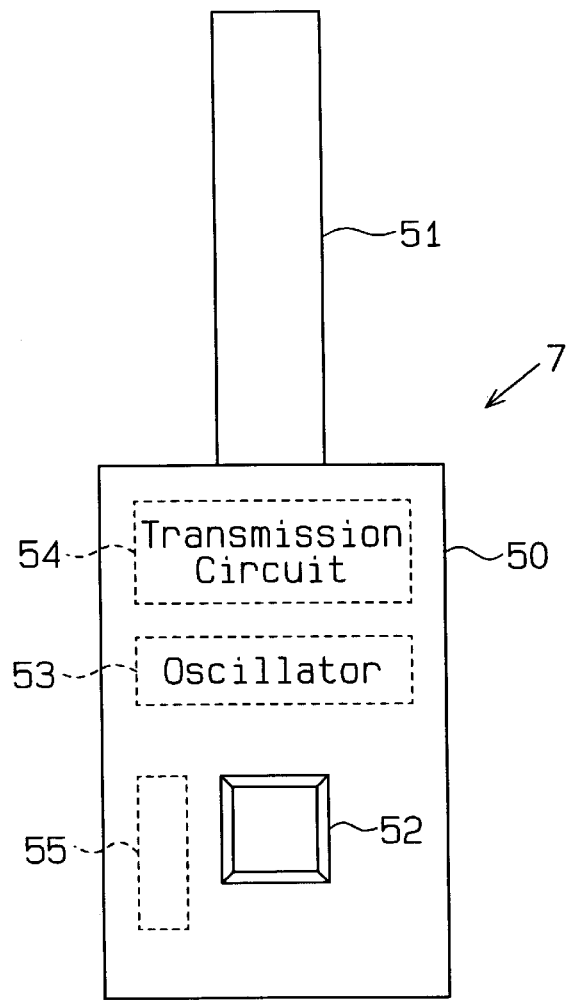
FIG. 6 is a block circuit view showing an external controller that activates or deactivates the transmitter.

The external controller 7 shown in FIG. 6 wirelessly transmits the control signal that activates or deactivates the transmitters 3. The external controller 7 is preferably a portable device. The external controller 7 includes a case 50 and a bar-shaped transmission antenna 51, which extends from the case 50. A switch 52 that operates or stops the external controller 7 is located on the case 50.

Within the case 50 are an oscillator 53, a transmission circuit 54, and a battery 55. The oscillation circuit 53 generates the control signal (trigger signal) shown in FIG. 7. The transmission circuit 54 imposes amplitude modulation on the control signal generated by the oscillation circuit 53 and then sends the signal to the transmission antenna 51. The battery 55 powers the external controller 7.

The operation and advantages of the illustrated tire inflation pressure monitor and the external controller 7 will now be described.

First, a method for activating the transmitters 3 will be described. The transmission antenna 51 of the external controller 7 is positioned close to or in contact with the cap 12 of the valve stem 11 that projects from the wheel rim 5a. In this state, the switch 52 of the external controller 7 is turned on. Then, the oscillation circuit 53 generates the control signal shown in FIG. 7, and the transmission circuit 54 performs amplitude modulation of the control signal. Then, the control signal is transmitted from the transmission antenna 51.

The control signal transmitted from the external controller 7 is received by the antenna coil 24 in the cap 12 and is sent to the tuning circuit 33 through the impedance matching circuit 32. The tuning circuit 33 excludes unnecessary components such as noise signals from the input signal and outputs only the required control signal to the detection circuit 34. The control signal is demodulated in the detection circuit 34 and is shaped in the shaping circuit 35. As a result, the control signal shown in FIG. 7 is input to the controller 30 as a trigger signal.

When the three low-level signals of the trigger signal are input to the controller 30 within five seconds, the controller 30 is activated. The controller 30, when activated, immediately commands the transmission circuit 31 to send data including the pressure data from the pressure sensor 14 and the registered ID data, which starts the normal operation of the transmitter 3.

If the initialization switch of the receiver 4 is turned on prior to the activation of the transmitter 3, the ID code included in the data from the transmitter 3 is initially registered in the nonvolatile memory 45. Accordingly, if the transmitters 3 of the four tires 2 are activated by the external controller 7 in turn when the initialization switch of the receiver 4 is turned on, the ID codes of the four transmitters 3 are initially registered in the receiver 4.

The transmitter 3 performs transmission at relatively long time intervals of, for example, ten minutes. Therefore, if the receiver 4 waits for the data transmission from the activated transmitters at ten-minute intervals in the initial registration, it takes ten minutes at the longest to complete the initial registration after the initialization switch is turned on. Furthermore, the four transmitters 3 send data at different times, and it is impossible to specify which transmitter 3 has sent the data to the receiver 4. Accordingly, it is difficult to relate the registered ID codes to the positions of the tires 2 with respect to the vehicle 1.

However, in the present invention, the deactivated transmitters 3 immediately perform transmission when activated by the external controller 7. Therefore, if the four transmitters 3 are activated in turn by the external controller 7 after the initialization switch of the receiver is turned on, the ID codes of the four transmitters 3 are efficiently registered in the receiver 4 in a relatively short time. Furthermore, if the transmitters 3 are activated in a predetermined order, the registered ID codes can be related to the position of the tires 2 with respect to the vehicle 1.

Similarly, when inactivating the activated transmitters 3, the transmission antenna 51 of the external controller 7 is positioned close to or in contact with the cap 12 of the valve stem 11. If the switch 52 of the external controller 7 is turned on in this state, the control signal shown in FIG. 7 is transmitted from the transmission antenna 51 and is received at the antenna coil 24. Accordingly, the control signal is input to the controller 30 of the transmitter 3 as a trigger signal. If the three low-level signals of the trigger signal are input to the controller 30 within five seconds, the controller 30 is deactivated, which places the transmitter 3 in a sleep state.

In this way, the transmitters 3 are externally activated or deactivated by simply performing wireless transmission of the control signal from the external controller 7. The data transmission from each transmitter 3 can be arbitrarily started or stopped. This facilitates initial registration of ID codes of the transmitters 3 to the receiver 4 and allows the transmitters 3 to be turned on or off to comply with local communication laws.

As in a crystal set having no electric power source, the electric power of the received signals alone can operate the tuning circuit 33, the detection circuit 34, and the shaping circuit of the transmitter 3, as long as the received signals have a certain degree of electric power. One way to achieve this is to increase the output strength of the radio waves from the external controller. However, the output strength of the radio waves is regulated by local communication laws and cannot be increased to a large degree.

In the present invention, radio waves are output from the transmission antenna 51 of the external controller 7 when the transmission antenna 51 is positioned close to or in contact with a cap 12 that includes an antenna coil 24. Therefore, radio waves from the transmission antenna 51 are efficiently transmitted to the intended antenna coil 24. Furthermore, the shaping circuit 35, which includes a transistor, can operate with little power, for example, 50 $\mu$A. Accordingly, it is not necessary to increase the output of the radio waves from the external controller 7 to a large degree. This allows the external controller 7 to comply with the laws of many countries.

The activated transmitter 3 performs wireless transmission of data including the pressure data and the ID code from the antenna coil 24. The antenna coil 24 is embedded in the cap 12 attached to the distal end of the valve stem 11. That is, the antenna coil 24 is located at the distal end of the valve stem 11, which extends from the wheel 5. Therefore, the efficiency of the transmission of radio waves from the antenna coil 24 is improved, which improves the performance of the transmitter 3 without increasing the output strength of the radio waves.

Even when the transmitter 3 of the present embodiment is attached to a wheel from which the valve stem 11 scarcely projects, efficient emission of radio waves from the antenna coil 24 is achieved since the antenna coil 24 is located at the distal end of the valve stem 11. Therefore, the shape of wheels that permit installation of the transmitter 3 is not limited, and the transmitter 3 can be installed on any of the various wheels that exist in the market.

When air is injected into the tire 2, the cap 12 including the antenna coil 24 is detached from the valve stem 11. Therefore, the antenna coil 24 does not interfere with the injection of air into the tire 2.

The cap 12 includes the antenna coil 24 and has a simple structure, which facilitates usage and reduces manufacturing costs.

The present examples and embodiments are to be considered as illustrative and not restrictive and the invention is not to be limited to the details given herein, but may be modified within the scope and equivalence of the appended claims.

What is claimed is:

1. A tire pressure monitoring apparatus comprising:
   a wheel transmitter for wirelessly transmitting data concerning vehicle tire inflation pressure, the wheel transmitter including:
   a wheel-mounted antenna;
   a pressure sensor for measuring the tire inflation pressure of an associated tire;
   a wheel-mounted transmission circuit for sending data that includes data representing the measured tire inflation pressure to the wheel-mounted antenna;
   an internal controller for controlling the pressure sensor and the wheel-mounted transmission circuit;
   a signal generation circuit, which is connected to the wheel-mounted antenna, wherein the signal generation circuit generates a trigger signal for activating or deactivating data transmission from the wheel-mounted transmission circuit based on a particular trigger signal received through the wheel-mounted antenna, wherein the signal generation circuit sends the trigger signal to the internal controller; and
   an external control unit for controlling the wheel transmitter, the external control unit including:
   a wireless control unit-mounted transmission antenna;
   an operation switch;
   an oscillator, which generates the particular trigger signal for activating or deactivating the transmission of data from the wheel transmitter when the operation switch is turned on; and control unit-mounted transmission circuit, which demodulates and sends the generated particular trigger signal to the control unit-mounted transmission antenna, wherein the particular trigger signal is transmitted from the control unit-mounted transmission antenna to the wheel-mounted antenna when the control unit-mounted transmission antenna is positioned close to or in contact with the wheel-mounted antenna.

2. A transmitter for performing wireless transmission of data concerning tire inflation pressure of a tire supported by a vehicle wheel, the transmitter comprising:

a main body, which is located inside the tire;

a valve stem, which extends from the main body through the wheel;

a removable cap, which is attached to the distal end of the valve stem;

an antenna coil, which is embedded in the cap;

a pressure sensor, which is located in the main body to measure the tire inflation pressure; and a transmission circuit, which is located in the main body, wherein the transmission circuit sends data that includes data representing the measured tire inflation pressure to the antenna coil through the valve stem for wireless transmission from the antenna coil.

3. The transmitter according to claim 2, wherein the valve stem is made of conductive material, the cap includes a conductive cylinder, which is fitted around and electrically connected to the valve stem, and an insulator covering the cylinder, wherein the antenna coil is embedded in the insulator to surround the cylinder, and the antenna coil is electrically connected to the cylinder.

4. The transmitter according to claim 3, wherein the valve stem includes a male thread and the cylinder includes a female thread that engages the male thread.

5. A transmitter for performing wireless transmission of data concerning vehicle tire inflation pressure, the transmitter comprising:

a transmission antenna;

a pressure sensor for measuring the tire inflation pressure;

a transmission circuit for sending data that includes data representing the measured tire inflation pressure to the antenna for wireless transmission;

a controller for controlling the pressure sensor and the transmission circuit;

a signal generation circuit, which is connected to the antenna, wherein the signal generation circuit generates a trigger signal for activating or deactivating data transmission from the transmission circuit based on a particular signal received through the antenna, wherein the signal generation circuit sends the trigger signal to the controller;

a valve stem that projects from a wheel supporting the tire, wherein the valve stem is made of conductive material; and a removable cap, which is attached to the distal end of the valve stem, wherein the antenna is an antenna coil embedded in the removable cap, and the cap includes a conductive cylinder, which is fitted around and electrically connected to the valve stem, and an insulator for covering the cylinder, wherein the antenna coil is embedded in the insulator to surround the cylinder and is electrically connected to the cylinder.

6. The transmitter according to claim 5, wherein the signal generation circuit includes:

a tuning circuit, which selects only a particular signal from signals received through the antenna;

a detection circuit, which demodulates the selected particular signal; and a shaping circuit, which shapes the demodulated particular signal into a predetermined trigger signal.

7. The transmitter according to claim 5, wherein the controller is activated or deactivated based on the reception of the trigger signal.

8. The transmitter according to claim 7, wherein the controller, when active, normally controls the pressure sensor and the transmission circuit such that data is transmitted at predetermined time intervals, and the controller controls the pressure sensor and the transmission circuit such that data transmission is immediately performed when the controller is activated by the trigger signal.

9. The transmitter according to claim 5, wherein the valve stem includes a male thread and the cylinder includes a female thread that engages the male thread.

* * * * *